(12) United States Patent
Whittaker et al.

(10) Patent No.: US 7,754,087 B2
(45) Date of Patent: *Jul. 13, 2010

(54) DEWATERING PROCESS

(75) Inventors: Tony Whittaker, Bradford (GB); Peter Norman, Liversedge (GB); Darryl Smith, Singapore (SG)

(73) Assignee: Ciba Specialty Chemicals Water Treatments, LTD, Bradford (GB)

( * ) Notice: Subject to any disclaimer, the term of this patent is extended or adjusted under 35 U.S.C. 154(b) by 420 days.

This patent is subject to a terminal disclaimer.

(21) Appl. No.: 10/591,878

(22) PCT Filed: Feb. 28, 2005

(86) PCT No.: PCT/EP2005/002079

§ 371 (c)(1), (2), (4) Date: Sep. 6, 2006

(87) PCT Pub. No.: WO2005/097687

PCT Pub. Date: Oct. 20, 2005

(65) Prior Publication Data

US 2007/0187333 A1 Aug. 16, 2007

(30) Foreign Application Priority Data

Mar. 12, 2004 (GB) ................................ 0405505.9

(51) Int. Cl.
C02F 11/14 (2006.01)

(52) U.S. Cl. ........................ 210/727; 210/728; 210/734; 210/738

(58) Field of Classification Search .................. 210/728
See application file for complete search history.

(56) References Cited

U.S. PATENT DOCUMENTS

| | | | | |
|---|---|---|---|---|
| 3,578,586 A * | 5/1971 | Gal et al. | ...................... | 210/710 |
| 4,506,062 A | 3/1985 | Flesher et al. | ................ | 526/211 |
| 4,528,321 A | 7/1985 | Allen et al. | ................... | 524/761 |
| 4,599,379 A | 7/1986 | Flesher et al. | ................ | 524/801 |
| 4,720,346 A | 1/1988 | Flesher et al. | ................ | 210/734 |
| 4,861,492 A * | 8/1989 | Lehmkuhl et al. | ........... | 210/709 |
| 5,112,500 A | 5/1992 | Jones | ......................... | 210/728 |
| 5,178,774 A * | 1/1993 | Payne et al. | ................... | 210/727 |
| 5,213,693 A | 5/1993 | McGrow et al. | ............... | 210/728 |
| 5,370,800 A * | 12/1994 | Stevenson | .................... | 210/710 |
| 5,834,545 A * | 11/1998 | Batty et al. | ................... | 524/276 |
| 5,846,433 A * | 12/1998 | Sorensen et al. | ............ | 210/709 |
| 6,001,920 A | 12/1999 | Ghafoor et al. | ............. | 524/500 |
| 6,031,037 A | 2/2000 | Ghafoor et al. | ............. | 524/388 |
| 6,060,164 A * | 5/2000 | Green et al. | ................. | 428/402 |
| 6,063,291 A | 5/2000 | Allen et al. | ................... | 210/727 |
| 6,117,938 A * | 9/2000 | Farinato et al. | ............. | 524/801 |
| 6,485,651 B1 | 11/2002 | Branning | ..................... | 210/702 |
| 6,702,946 B1 * | 3/2004 | Huang et al. | ................. | 210/723 |
| 6,805,803 B1 | 10/2004 | Weier et al. | .................. | 210/728 |
| 7,070,696 B2 * | 7/2006 | Weir et al. | ................... | 210/727 |
| 7,252,783 B2 * | 8/2007 | Weir et al. | ................... | 252/180 |
| 2003/0178371 A1 * | 9/2003 | Norman et al. | ............. | 210/723 |
| 2006/0016761 A1 | 1/2006 | Mohammed et al. | ........ | 210/728 |

FOREIGN PATENT DOCUMENTS

| | | |
|---|---|---|
| EP | 0 102 760 | 3/1984 |
| EP | 0 126 528 | 11/1984 |
| EP | 0 150 933 | 8/1985 |
| EP | 0 202 780 | 11/1986 |
| EP | 0 479 616 | 4/1992 |
| EP | 1 035 077 | 9/2000 |
| JP | 61-257300 | 11/1986 |
| JP | 6-343999 | 12/1994 |
| JP | 6-344000 | 12/1994 |
| JP | 10-249398 | 9/1998 |
| WO | 98/31748 | 7/1998 |
| WO | 98/31749 | 7/1998 |
| WO | 99/50195 | 10/1999 |
| WO | 01/05712 | 1/2001 |
| WO | 02/072482 | 9/2002 |
| WO | 02/079099 | 10/2002 |
| WO | 2004/022493 | 3/2004 |

OTHER PUBLICATIONS

English Language abstract of EP 1 035 077 from the esp@cenet web site printed Oct. 31, 2006.
Derwent abstract No. 1998-561468 for Japanese Patent 10-249398 Oct. 24, 2006.
Derwent abstract No. 1986-343211 for Japanese Patent 61-257300 (2006).
Derwent abstract No. 1995-069521[10] for Japanese Patent 6-343999 (2006).
Derwent abstract No. 1995-069522[10] for Japanese Patent 6-344000 (2006).

* cited by examiner

*Primary Examiner*—Peter A Hruskoci
(74) *Attorney, Agent, or Firm*—Shiela A. Loggins

(57) ABSTRACT

A process of dewatering aqueous suspension employing a flocculating system comprising treating the suspension with a flocculating amount of a first flocculant and a dewatering amount of a second flocculant, and subjecting the suspension to mechanical dewatering to form a cake, wherein the first flocculant brings about flocculation and assists thickening of the suspension and the second flocculant is a water-soluble or water swellable polymer that is mixed into the suspension is a water-soluble or water swellable particulate polymer having a particle diameter of at least 20 microns.

13 Claims, No Drawings

DEWATERING PROCESS

The present invention concerns the flocculation and dewatering of aqueous suspensions to form a dewatered cake.

It is well known to apply flocculants to aqueous suspensions in order to separate solids from the suspension. For instance it is common practice to flocculate and then dewater suspensions containing either suspended solid organic material or mineral solids. For instance it is common practice to flocculate sludges such as sewage sludge, waste waters, textile industry effluents, red mud from the Bayer Alumina process and suspensions of coal tailings etc. Flocculation is usually achieved by mixing into the suspension the flocculant, allowing the suspended particles to flocculate and then dewatering the flocculated suspension to form a dewatered cake.

In the dewatering of suspensions it is known to add a high molecular weight, water soluble polymer as a flocculant to the suspension in order to remove the liquid from the suspension and greatly increase the dry solids of the suspension. High molecular weight flocculants may be cationic, anionic, nonionic or amphoteric in nature. The choice of polymeric flocculant will largely depend upon the susbstrate, which is being treated. For instance it is common practice to use high molecular weight cationic flocculants to treat aqueous suspensions comprising suspended organic material, for instance sewage sludge. In paper-making it is known to use either cationic, nonionic, anionic or amphoteric flocculants. Flocculation of mineral suspensions is frequently effected by use of anionic flocculants.

It is standard practice to apply polymers as aqueous compositions to flocculate suspensions containing suspended organic material. Generally the compositions of polymers are relatively dilute, for instance no more than 1% and usually no more than 0.5%, and can be as low as 0.2% by weight or lower.

Various alternative methods of introducing a flocculent into a suspension have been proposed. WO-A-02/079099 describes in a method in which at least one flocculant emulsion and is added directly to a solids liquid separation process and inverted in situ such that flocculant is released directly into the application. The emulsion is added specifically at the solids liquid separation process and subjected to an effective amount of high shear for sufficient time and pressure to ensure rapid inversion of the emulsion and complete release of the flocculant into the bulk suspension before any initial separation.

WO-A-98/31749 and WO-A-98/31748 and of both concerned with preparing dispersions of high intrinsic viscosity cationic polymers in an aqueous and medium containing dissolved low intrinsic viscosity cation polymer. The product thus formed is an aqueous dispersion of undissolved high intrinsic viscosity cationic polymer which is a convenient way of providing high molecular weight flocculants. The dispersion polymer can be dissolved in water to a conventional concentration or can be added directly to a suspension.

It is also known to use two different polymeric flocculants in the same process. In commercial practice the dewatering of sewage sludge may involve the addition of two polymeric flocculants which have the same charge (co-ionic). In other processes it is known to apply two polymers of opposite charge. (counter-ionic). Where two polymeric flocculants are applied to an aqueous suspension they may be added simultaneously or more usually sequentially.

WO9950195 describes a process of dewatering an aqueous suspension of suspended organic solids by adding to the suspension an aqueous composition comprising a first water-soluble ionic polymeric flocculant and a second water-soluble ionic polymeric flocculant. The first flocculant is in excess over the second flocculant and both flocculants are counterionic. It is a requirement that the first flocculant and second flocculant form particles of counterionic precipitate. The counter ionic precipitate is designed to rupture in order to release the second flocculant and contained within the counter ionic precipitate.

U.S. Pat. No. 6,063,291 discloses flocculation of suspensions using the addition of a mixture of counter ionic flocculants in which one of the flocculants is particulate. U.S. Pat. No. 5,112,500 discloses separate addition of dry cationic polymer particles and dry anionic polymer particles to a suspension to flocculate it.

Such counter ionic flocculant systems can bring about deleterious effects when attempting to dewater certain sludges, especially sludges that contain significant amounts of organic components, such as sewage sludges.

WO-A-01/05712 reveals a process of dewatering a suspension by adding to the suspension concentrated a dilute solution of polymeric flocculants substantially simultaneously. Both the concentrated and diluted solutions of polymer and are added at conventional concentrations of no more than 1% and usually much less than this.

WO-A-02/72482 describes a process of flocculating and dewatering an aqueous suspension of suspended solids in which a polymer composition comprising 40% and 60% by weight polymer and a polymer composition comprising between 0.05 and 0.2% by weight polymer are introduced simultaneously. Although the process brings about some improvements in filtration and free drainage, it would be desirable to improve upon the cake solids obtained in dewatering suspensions, especially for sewage sludges.

International application PCT/EP03/09381, unpublished at the priority date of present application, describes a method of dewatering a suspension employing a composition comprising a cationic polymer flocculant and a coagulant in which the coagulant is encapsulated. After free drainage of the suspension the coagulant is released into the suspension for example by rupturing of the capsules which enclose the coagulant or by migration from a matrix in which the coagulant is entrapped. Although significant improvements in cake solids can be obtained in it would be desirable to provide equivalent or improved cake solids using flocculent products that can be more easily manufactured and/or applied.

However, achieving high cake solids can sometimes be difficult, particularly in the dewatering of sewage sludges. It is also known to add a flocculant or coagulant to assist the initial dewatering of a suspension followed by further addition of flocculant or coagulant and then further dewatering to achieve high cake solids. Such processes are described in JP-A-10-249398, JP-A-61-257300, JP-A-06-343999, JP-A-06-344000 and EP-A-1035077. However, these processes have the disadvantage that they require two stages of dewatering involving two separate treatments with flocculant.

It would be desirable to provide an improved process that results in dewatering of suspensions to provide increased cake solids. In particular it would be desirable to provide such a process that involves treatment agents that can be more easily and conveniently manufactured and applied. A further objective of the present invention is to provide a process that avoids the necessity of employing flocculant additions in two separate steps.

According to the present invention we provide a process of dewatering aqueous suspension employing a flocculating system comprising treating the suspension with a flocculating amount of a first flocculant and a dewatering amount of a second flocculant, and subjecting the suspension to mechanical dewatering to form a cake, wherein the first flocculant brings about flocculation and assists thickening of the suspension and the second flocculant further dewaters the suspension, characterised in that the second flocculent is a water-soluble or water swellable polymer that is mixed into the suspension in the form of a water-soluble or water swellable particulate polymer having a particle diameter of at least 20 microns, wherein the first and second flocculants are not counter ionic.

It is important that first and second flocculants do not form a counterionic precipitate. For instance, the first flocculant may be nonionic whilst the second flocculant can be anionic but preferably is cationic. Alternatively, the first flocculant may either be cationic or anionic and the second flocculant would be nonionic. It is especially preferred that both the first and second flocculants are co-ionic so that both flocculants are either anionic but most preferably are cationic.

The invention is applicable to any suitable suspensions in which it is desirable concentrate the suspended solids. This includes waste waters, and textile industry effluents mineral suspensions such as red mud from the Bayer Alumina process or coal tailings, in paper mill wastes such as cellulosic sludges. The process is particularly applicable to the dewatering of sewage sludge.

In the dewatering processes the suspension is first thickened following the addition of the first flocculant. This stage involves the initial flocculation and release of free water to produce the thickened suspension. Generally the release of free water may be achieved by free drainage or filtration and it is common to employ mechanical means such as a belt thickener, belt press rotary drum thickener or centrifuge. The flocculant should be applied in sufficient quantity to bring about initial flocculation and partial dewatering of the suspension. Preferably the suspension is thickened to produce a semi solid sludge paste. In general this first flocculant will be a polymer added at a conventional concentration, for instance 0.1% to 1% by weight, especially 0.2% to 0.5%.

Typically addition of the first flocculant and second flocculant would be into the initial bulk suspension.

The dewatering process involves the action of the second flocculent on the thickened suspension in which the second flocculant is in the form of polymer particles having a particle diameter of at least 20 microns. The particulate second flocculent may be partially hydrated although it is preferred that it is substantially dry. We find that the particulate second flocculant does not substantially mix into the bulk suspension prior to thickening but it does integrate into the thickened suspension during mixing and/or mechanical dewatering and brings about further release of water to produce a dewatered cake. The polymeric particles can be easily mixed into the thickened suspension and distributed throughout using conventional mixing equipment. Suitable mixing equipment includes for instance ribbon type mixers on or kneading mixers. Ribbon type mixers consist of helical or spiral mixing blades that sweep across nearly the entire surface of the mixing vessel. Kneading mixers consist of two kneading arms that intermesh as well as form a close tolerance to the mixer wall. Alternatively the second flocculant can be distributed throughout the thickened sludge during mechanical dewatering. Typically, this mechanical dewatering will normally involve compression and can for instance be any of belt press, filter press, screw press or centrifuge. When this treated thickened suspension is subjected to mechanical dewatering unexpectedly high cake solids are achieved.

Usually the second flocculant will be a particulate polymer having a particle diameter of at least 50 microns. The polymeric particles may have a particle diameter as high as 2000 or 3000 microns or higher or can be as low as 10 or 20 microns or lower, although usually will not be below 50 microns. Generally the particle diameter will be in the range of 50 microns to 2000 microns. Preferably, the particles will have an diameter between above 100 and 800 microns, for instance 120 or 150 to 800 microns. More preferably the particles will range between 250 and 750 microns. The particles may also be defined by weight average particle diameter generally this will be between 50 and 1000 microns, preferably 100 to 800 microns and more preferably between 300 and 700 microns.

The first and second flocculants may be any suitable natural or synthetic polymeric flocculant and typically will be high molecular weight. Natural polymers include for instance cationic starch, anionic starch and chitosan etc. Synthetic polymers include linear, branched and cross-linked polymers of ethylenically unsaturated monomers. The first flocculant may be the same as the second flocculant or alternatively the two flocculants may be different. Usually the polymer of the first flocculant and second flocculant will be of molecular weight in excess of 500,000, usually at least one million and normally 5 million up to 30 million.

The first and second flocculants of the present invention may be cationic, anionic, nonionic in nature. The choice of polymeric flocculant will largely depend upon the substrate, which is being treated. For instance it is common practice to use high molecular weight cationic flocculants to treat aqueous suspensions comprising suspended organic material, for instance sewage sludge. In treating paper-mill waste it is known to use either cationic, nonionic, anionic or amphoteric flocculants. Flocculation of mineral suspensions is frequently effected by use of anionic flocculants. As indicated previously either the first and second flocculants should be co ionic or that at least one of them may be non-ionic. Hence, the first and second flocculants should not be counter-ionic.

The polymer may be prepared by polymerisation of a water soluble monomer or water soluble monomer blend. By water soluble we mean that the water soluble monomer or water soluble monomer blend has a solubility in water of at least 5 g in 100 ml of water. The polymer may be prepared conveniently by any suitable polymerisation process.

When the water soluble polymer is nonionic the polymer may be formed from one or more water soluble ethylenically unsaturated nonionic monomers, for instance acrylamide, methacrylamide, hydroxyethyl acrylate, N-vinylpyrrolidone. Preferably the polymer is formed from acrylamide.

When the water soluble polymer is anionic the polymer is formed from one or more ethylenically unsaturated anionic monomers or a blend of one or more anionic monomers with one or more of the nonionic monomers referred to previously. The anionic monomers are for instance acrylic acid, methacrylic acid, maleic acid, crotonic acid, itaconic acid, vinylsulphonic acid, allyl sulphonic acid, 2-acrylamido-2-methylpropane sulphonic acid and salts thereof. A preferred polymer is the copolymer of sodium acrylate with acrylamide.

Preferably the water soluble polymer is cationic and is formed from one or more ethylenically unsaturated cationic monomers optionally with one or more of the nonionic monomers referred to herein. The cationic polymer may also be amphoteric provided that there are predominantly more cationic groups than anionic groups. The cationic monomers include dialkylamino alkyl (meth) acrylates, dialkylamino alkyl (meth) acrylamides, including acid addition and quaternary ammonium salts thereof, diallyl dimethyl ammonium chloride. Preferred cationic monomers include the methyl chloride quaternary ammonium salts of dimethylamino ethyl acrylate and dimethyl aminoethyl methacrylate. A particularly preferred polymer includes the copolymer of acrylamide with the methyl chloride quaternary ammonium salts of dimethylamino ethyl acrylate.

The polymers may be linear in that they have been prepared substantially in the absence of branching or cross-linking agent. Alternatively the polymers can be branched or cross-linked, for example as in EP-A-202780.

Desirably the polymer may be prepared by reverse phase emulsion polymerisation, optionally followed by azeotropic dehydration to form a dispersion of polymer particles in oil. Alternatively the polymer may be provided in the form of beads by reverse phase suspension polymerisation, or as a powder by aqueous solution polymerisation followed by comminution, drying and then grinding. The polymers may be produced as beads by suspension polymerisation or as a water-in-oil emulsion or dispersion by water-in-oil emulsion polymerisation, for example according to a process defined by EP-A-150933, EP-A-102760 or EP-A-126528.

It is particularly preferred that the second flocculant is formed from at least 30% by weight cationic monomer or monomers. Even more preferred are polymers comprising at least 40 or 50% by weight cationic monomer units. It may be desirable to employ cationic polymers having very high cationicities, for instance up to 80 or even 100% cationic monomer units. It is especially preferred when the cationic second flocculant polymer is selected from the group consisting of cationic polyacrylamides, polymers of dialkyl diallyl ammonium chloride, dialkyl amino alkyl (meth)-acrylates (or salts thereof) and dialkyl amino alkyl (meth)-acrylamides (or salts thereof).

As stated previously the second flocculant is desirably of relatively high molecular weight. Normally the second flocculant will be a polymer that exhibits an intrinsic viscosity of at least 0.5 dl/g. Typically the intrinsic viscosity will be the least 3 dl/g, and often it can be as high as 20 or 30 dl/g but preferably will be between 4 and 10 dl/g.

Intrinsic viscosity of polymers may be determined by preparing an aqueous solution of the polymer (0.5-1% w/w) based on the active content of the polymer. 2 g of this 0.5-1% polymer solution is diluted to 100 ml in a volumetric flask with 50 ml of 2M sodium chloride solution that is buffered to pH 7.0 (using 1.56 g sodium dihydrogen phosphate and 32.26 g disodium hydrogen phosphate per liter of deionised water) and the whole is diluted to the 100 ml mark with deionised water. The intrinsic viscosity of the polymers are measured using a Number 1 suspended level viscometer at 25° C. in 1M buffered salt solution.

One particularly useful cationic polymer type for use as the second flocculant includes 50 to 100% by weight methyl chloride quaternary ammonium salt of dimethyl amino ethyl (meth) acrylate and 0 to 50% by weight acrylamide of intrinsic viscosity between 4 and 10 dl/g. Preferably the cationic polymer comprises at least 80% methyl chloride quaternary ammonium salt of dimethyl amino ethyl (meth) acrylate.

Other suitable polymeric second flocculants include polyvinyl amidine and polyvinyl amines of intrinsic viscosity greater than 1 dl/g, preferably greater than 2 dl/g.

Another particularly suitable category of second flocculants are Mannich addition polyacrylamides. Ideally such polymers will exhibit an intrinsic viscosity greater than 1 dl/g and quite often can be at least 4 dl/g, for instance at least 7 or 8 dl/g. Such polymers may be made by reacting formaldehyde/amine adducts with polyacrylamide. The amine may for instance be dimethylamine or other secondary amines. Preferably the Mannich addition polyacrylamides are quatenised salts and these could be prepared by reacting the free base Mannich with a suitable quaternising agent such as methyl chloride or dimethyl sulfate.

Another suitable polymer as the second flocculant includes poly dimethyl diallyl ammonium chloride of intrinsic viscosity greater than 0.5 dl/g, preferably at least 1 dl/g.

Effective dewatering of suspensions can be achieved when these polymers are used as the second flocculant.

The dose of aqueous composition depends on the substrate and usually this will be a conventional amount. Typically for sewage sludge treatment the dose of the aqueous composition (second flocculant) found to be an effective dewatering amount is often at least 50 mg active polymer per liter of suspension. Usually the amount would be higher for instance up to 400 mg per liter. Preferred doses are between 60 and 300 mg per liter. The quantity of first flocculant used will usually be at least 50 mg active polymer per liter of suspension and can be as high as 500 or 600 mg per liter. Preferred doses would be between 100 and 400 mg per liter.

Various polymers may be used as the first flocculant in order to obtain a suitably thickened suspension for treatment with the second flocculant. Preferably the first flocculant is a cationic organic polymer. This is particularly true when the suspension is a sewage sludge. Preferred cationic polymers include polymers selected from the group consisting of acrylamide polymers, polyvinyl amidine, polyvinyl amine, poly dimethyl diallyl ammonium chloride, poly amines, polyethyleneimines, mannich polyacrylamides and quaternised mannich polyacrylamides.

The first and second flocculants may be added sequentially and in which case usually the second flocculant is added to the suspension first although the reverse order may be employed. Normally the first and second flocculants are added in close proximity and preferably they are added substantially simultaneously. When the two flocculants are added in this way they can desirably be added separately although in some situations the first flocculant and the second flocculant are combined into a single composition with beneficial results. In one preferred aspect the single composition is a particulate polymer product in which the first flocculant comprises particles having a diameter below 10 microns and the second flocculant comprises particles having a diameter above 20 microns, preferably above 50 microns. The particle size of the second flocculant may be as defined previously. We have found the first flocculant tends to act substantially immediately on the suspension and brings about flocculation and thickening and then the larger particle size second flocculant can distribute easily throughout the thickened suspension to bring about further dewatering.

Particularly effective results can be achieved when the first and second flocculants are added to the sludge simultaneously but separately. Without being limited to theory it is believed that the first flocculant results in flocculation of the sludge and the undispersed polymer of the second flocculant becomes trapped within the flocculated structure but does not bring about any significant dewatering until the flocculated sludge is thickened and then by mixing the polymer of the second flocculant is allowed to distribute throughout and integrate with the sludge and achieve further dewatering.

In a further embodiment the second flocculant comprises polymeric particles having a coating applied to the surface. The coating delays the dissolution of the second flocculant particles so that on addition to the suspension the first flocculant acts on the suspension to bring about flocculation and produce a thickened suspension and the coated second flocculant particles are distributed throughout the thickened suspension and bring about further dewatering. The coating may for instance be a silicone compound or alternatively it may be a water-soluble wax. The water-soluble wax and can for instance be a polyethyleneglycol or a polypropylene glycol. A suitable water-soluble wax is for instance polyethyleneglycol with a molecular weight of 600 (PEG600) or above. It may be desirable to combine first and second flocculants into a single composition in which the second flocculant comprises coated particles.

In a still further embodiment of the present invention, the second flocculant may be introduced in the suspension in the form of a slurry of second flocculant polymer particles in a liquid. The liquid may be a suitable liquid that does not adversely interact with either the particles of the second flocculant or the suspension. Suitably the liquid can be a polyethyleneglycol.

The following example is an illustration of the invention.

EXAMPLE

Dewatering of Aqueous Suspensions Via a One-stage Addition of a Conventional Solution and Dry Particles of Organic Polymer Flocculants Polymers Polymer A is a linear, high molecular weight, high cationic acrylamide based polymer of intrinsic viscosity 12 dl/g in the form of a dehydrated emulsion (liquid dispersion product). Polymer B is a linear, low-medium molecular weight, cationic homopolymer of quaternised dimethyl amino ethyl methacrylate of intrinsic viscosity 5 dl/g based polymer in bead form.

Unless otherwise stated intrinsic viscosity is measured using a Number 1 suspended level viscometer, in 1M sodium chloride buffered to pH 7 in accordance with the information given in the description.

Test Substrate

Dewatering tests were conducted on a sample of a digested, mixed primary/activated sludge. The sample had a dry solids content of 3.28%.

Experimental Procedure (A) One-stage Addition of Polymer(s)
i) Polymer A was first dissolved in deionised water to give a homogeneous 1% w/v solution and further diluted to 0.25% w/v prior to use. Polymer B was dissolved in deionised water to give a 1% w/v solution. The 1% w/v solution was further diluted with deionised water to 0.25% w/v prior to use.
ii) 250 ml of a digested, mixed primary/activated sludge was placed in a 1 liter plastic beaker (120 cm diameter by 120 cm tall). A standard laboratory stirrer was secured over the beaker with the stirrer shaft located through a hole in the centre of the beaker lid. The stirrer is a four bladed, flat crosshead type (each paddle is 25 cm width by 1.1 cm).
iii) An appropriate volume of a 0.25% solution of Polymer A, and a 0.25% solution or substantially dry particles (250-500 micron) of Polymer B, were added simultaneously to the sludge and the lid secured to the beaker. The sludge was flocculated by stirring at 1500 rpm for 15 s. The flocculated sludge was poured into a filtration cell, which had a filter membrane, comprising an 8 cm diameter belt-press filter cloth and the filtrate collected in a measuring cylinder.
iv) After 30 s drainage the thickened sludge retained on the filter cloth was subjected to a 'furrowing' technique, whereby a spatula was slowly drawn across the sludge in several directions to encourage release of more water. Furrowing was carried out for 30 s. The volume of filtrate was noted.
v) The thickened sludge was transferred to a 250 ml beaker and stirred by hand for 45 s with a spatula, using a slow, circular folding action.
vi) The thickened sludge was then transferred to a piston-press device and subjected to a compression dewatering stage. Dewatering was commenced using a pressure of 20 psi for 2 minutes, followed by increases of 10 psi, at one minute intervals, for a further 3 minutes to a maximum of 60 psi. Pressure was maintained at 60 psi for a further 5 minutes, giving a total compression dewatering time of 10 minutes. The wet cake was removed and the cake solids content was determined by heating at 110° C. overnight.

(B) One-stage Addition of Polymer(s) Excluding Mixing of the Thickened Sludge.

The procedure was exactly the same as that described in Section (A) except:
Section v) was omitted (C) Control—Addition of Dry Polymer Particles in a Two-stage Process The procedure was as that given in Section (A) except:
Section iii)—the appropriate volume of a 0.25% solution of Polymer A was added to the sludge using a syringe and the lid secured to the beaker. The sludge was flocculated by stirring at 1500 rpm for 10 s. The flocculated sludge was poured into a filtration cell comprising an 8 cm diameter belt-press filter cloth and the filtrate collected in a measuring cylinder.

Section v)—the thickened sludge was transferred to a 250 ml beaker. The appropriate weight of substantially dry particles of Polymer B (250-500 micron) was added into the thickened sludge. To mix in the polymer the treated thickened sludge was stirred by hand for 45 s with a spatula, using a slow, circular folding action.

Results

The results are given in Table 1

TABLE 1

| Data Set | Test Procedure | Polymer A Dose (mg/l) | Filtrate Volume (ml) | Polymer B Dose (mg/l) | Polymer B Solution strength (w/v) | Cake solids (%) |
|---|---|---|---|---|---|---|
| 1 | A | 200 | 182 | 100 | 0.25% | 15.85 |
|   |   | 200 | 182 | 150 | 0.25% | 16.65 |
|   |   | 200 | 184 | 200 | 0.25% | 17.05 |
| 2 | B | 200 | — | 100 | 0.25% | 17.37 |
|   |   | 200 | — | 150 | 0.25% | 17.99 |
|   |   | 200 | — | 200 | 0.25% | 17.36 |
| 3 | A | 200 | 160 | 75 | Dry particles* | 18.50 |
|   |   | 200 | — | 100 | Dry particles* | 19.81 |
|   |   | 200 | — | 150 | Dry particles* | 21.15 |
| 4 | C | 200 | 164 | 75 | Dry particles* | 18.27 |
|   |   | 200 | — | 100 | Dry particles* | 19.80 |
|   |   | 200 | 170 | 150 | Dry particles* | 21.47 |

*250-500 micron range

Data set 1 and 2 represent conventional addition of dilute polymer solutions to sewage sludge. The results show that, with conventional treatment, additional mixing of the thickened sludge (Set 1) has an adverse effect on cake solids compared to no additional mixing (Set 2).

Data Sets 3 and 4 show that improved cake solids can be achieved by adding substantially dry polymer at the first stage (Set 3) and that this is just as effective as adding substantially dry polymer at the second stage (Set 4).

The invention claimed is:

1. A process of dewatering an aqueous sewage sludge suspension employing a flocculating system comprising
   - i.) treating the suspension with a flocculating amount of a first flocculant having a molecular weight of at least one million and a dewatering amount of a second flocculant, which second flocculant is in the form of particulates,
   - ii.) thickening the treated suspension of step i.) by release of free water,
   - iii.) mixing the thickened suspension, wherein the second flocculant particulates are distributed throughout the thickened suspension of step ii.), using mixing equipment, and
   - iv.) subjecting the suspension to mechanical compression dewatering to form a cake, wherein the first flocculant brings about flocculation and assists thickening of the suspension and the second flocculant further dewaters the suspension, characterised in that the second flocculant is a water-soluble or water swellable polymer formed from 80 to 100% by weight methyl chloride quaternary ammonium salt of dimethyl amino ethyl (meth)acrylate and 0 to 20% by weight acrylamide of intrinsic viscosity between 3 and 10 dl/g that is mixed into the suspension in the form of a water-soluble or water swellable particulate polymer having a particle diameter of at least 50 microns, wherein the first and second flocculants are not counterionic and the first flocculant is cationic acrylamide polymer.

2. A process according to claim 1 in which the compression dewatering employs an apparatus selected from the group consisting of belt press, filter press, screw press and centrifuge.

3. A process according to claim 1 in which the first flocculant and second flocculant are added substantially simultaneously.

4. A process according to claim 1 in which the first flocculant and second flocculant are combined into a single composition.

5. A process according to claim 4 in which the single composition is a particulate polymer product in which the first flocculant comprises particles having a diameter below 10 microns.

6. A process according to claim 1 in which the second flocculant comprises polymeric particles having a coating applied to the surface.

7. A process according to claim 6 in which the coating is a silicone.

8. A process according to claim 6 in which the coating is a water-soluble wax.

9. A process according to claim 1 in which the second flocculant is introduced into the suspension in form of a slurry in a liquid.

10. A process according to claim 9 in which the liquid is polyethylene glycol.

11. A process according to claim 1, wherein the second flocculant is a polymer of intrinsic viscosity between 4 and 10 dl/g.

12. A process according to claim 1, wherein the second flocculant is a particulate polymer having a particle diameter between 100 and 800 microns.

13. A process according to claim 1, wherein thickened suspension in step ii.) is a semi solid sludge paste.

* * * * *